United States Patent
Hunaidi (10) Patent No.: US 6,453,247 B1
(45) Date of Patent: Sep. 17, 2002

(54) PC MULTIMEDIA-BASED LEAK DETECTION SYSTEM FOR WATER TRANSMISSION AND DISTRIBUTION PIPES

(75) Inventor: Osama Hunaidi, Ottawa (CA)

(73) Assignee: National Research Council of Canada, Ottawa (CA)

( * ) Notice: Subject to any disclaimer, the term of this patent is extended or adjusted under 35 U.S.C. 154(b) by 0 days.

(21) Appl. No.: 09/482,317

(22) Filed: Jan. 14, 2000

(51) Int. Cl.⁷ .............................................. G01M 3/00
(52) U.S. Cl. .................... 702/51; 702/54; 73/40.5 A; 73/579; 73/592
(58) Field of Search ............... 702/51, 54, 75, 702/76, 77; 73/40.5 A, 40, 570, 579, 592

(56) References Cited

U.S. PATENT DOCUMENTS

| | | |
|---|---|---|
| 4,083,229 A | 4/1978 | Anway |
| 4,543,817 A | 10/1985 | Sugiyama |
| 5,038,614 A | 8/1991 | Bseisu et al. |
| 5,416,724 A | 5/1995 | Savic |
| 5,974,862 A | 11/1999 | Lander et al. |
| 6,138,512 A * | 10/2000 | Roberts et al. ............ 73/40 |

FOREIGN PATENT DOCUMENTS

| | | |
|---|---|---|
| EP | 0 711 986 A2 | 5/1996 |
| EP | 0 711 986 A3 | 9/1998 |
| JP | 11201859 | 7/1999 |

* cited by examiner

Primary Examiner—Kamini Shah
(74) Attorney, Agent, or Firm—Freedman & Associates (57) ABSTRACT

This invention pertains to the detection of leaks in plastic water distribution pipes by processing the sound or vibration induced in the pipe by water escaping under pressure. Acoustic leak signals are measured at two (or more) contact points with the pipe, e.g., fire hydrants or valves, using vibration sensors or hydrophones. The signals are digitally recorded using the computer's soundcard. The leak is located using the difference in arrival times of two leak signals as determined from the cross-correlation function traditionally used in leak detection applications or an enhanced impulse response function. The enhanced impulse response function eliminates the need to filter leak signals before processing and hence avoids the uncertainty involved in selecting filter cutoff frequencies for non-experts. Listening to leak sound in plastic pipes is made possible in software by shifting their low-frequency content to an audible higher range. The software implementation of this system can be readily integrated with commercially available RF-based data transmitters and leak sensors—thus providing a complete, flexible, and inexpensive leak detection system.

25 Claims, 12 Drawing Sheets

PC MULTIMEDIA-BASED LEAK DETECTION SYSTEM FOR WATER TRANSMISSION AND DISTRIBUTION PIPES

FIELD OF THE INVENTION

The present invention relates to leak detection and more particularly to a method and system for locating leaks in municipal water distribution pipes.

BACKGROUND OF THE INVENTION

In most municipal water distribution systems a significant percentage of water is lost while in transit from treatment plants to users. According to an inquiry made in 1991 by the International Water Supply Association (IWSA), the amount of lost water is typically in the range of 20 to 30% of production. In the case of some systems, mostly older ones, the percentage of lost water could be as high as 50% or even more. Lost water is usually attributed to several causes including leakage, metering errors, and theft—according to the IWSA survey, leakage is the major cause.

Water leakage is a costly problem—not only in terms of wasting a precious natural resource but also in economic terms. The primary economic loss due to leakage is the cost of raw water, its treatment, and transportation. Leakage inevitably also results in secondary economic loss in the form of damage to the pipe network itself, e.g., erosion of pipe bedding and major pipe breaks, and in the form of damage to foundations of roads and buildings. Besides the environmental and economic losses caused by leakage, leaky pipes create a public health risk as every leak is a potential entry point for contaminants if a pressure drop occurs in the system.

Economic pressure, concern over public health risk and simply the need to conserve water motivate water system operators to implement leak detection surveys. Leaks may in some cases be detected visually by spotting leaking water on the ground surface. In most cases, however, leaks never surface and normally acoustic methods are used to locate leaks by utilizing the sound or vibration induced by water as it escapes from pipes under pressure.

Locating leaks using acoustic equipment normally consist of two phases. In the first phase, an initial survey is conducted by listening for leak sounds using for example listening rods or aquaphones on all accessible contact points with the distribution system such as fire hydrants, valves, etc. Suspect leak locations found in this phase are noted for more accurate determination (pinpointing) in the second phase. Leaks are pinpointed by using geophones or ground microphones to listen for leak sounds on the ground directly above the pipe at very close intervals, e.g., every 1 m (3.3 ft); or by using leak noise correlation devices known as leak correlators.

Listening devices utilize sensitive mechanisms or materials, e.g., piezo-electric elements, for sensing leak-induced sound and vibration. They could be either of the mechanical or electronic type. Modern electronic devices may include signal amplifiers and noise filters, which could be very helpful in adverse environments. The use of listening devices is usually straightforward but their effectiveness depends on the experience of the user.

Locating leaks in water distribution pipes is a classical application of the cross-correlation method described in the book "Engineering applications of Correlation and Spectral Analysis" written by J. S. Bendat and A. G. Piersol, and published by John Wylie and Sons, New York, 1980. The method has been applied in U.S. Pat. Nos. 4,083,229 and 5,205,173. In U.S. Pat. No. 5,974,862 several enhancements of the cross-correlation method were applied to improve the method's accuracy for detecting leaks. The enhancements included achieving higher signal-to-noise ratio by transmitting leak signals using a digital wireless system wherein signals are digitized at the sensor, achieving a higher dynamic range of the measurement system by applying variable-gain to leak signals to utilize the full range of analog-to-digital converters, and introducing an incremental approach in the calculation of the cross-correlation function.

Figure 1:
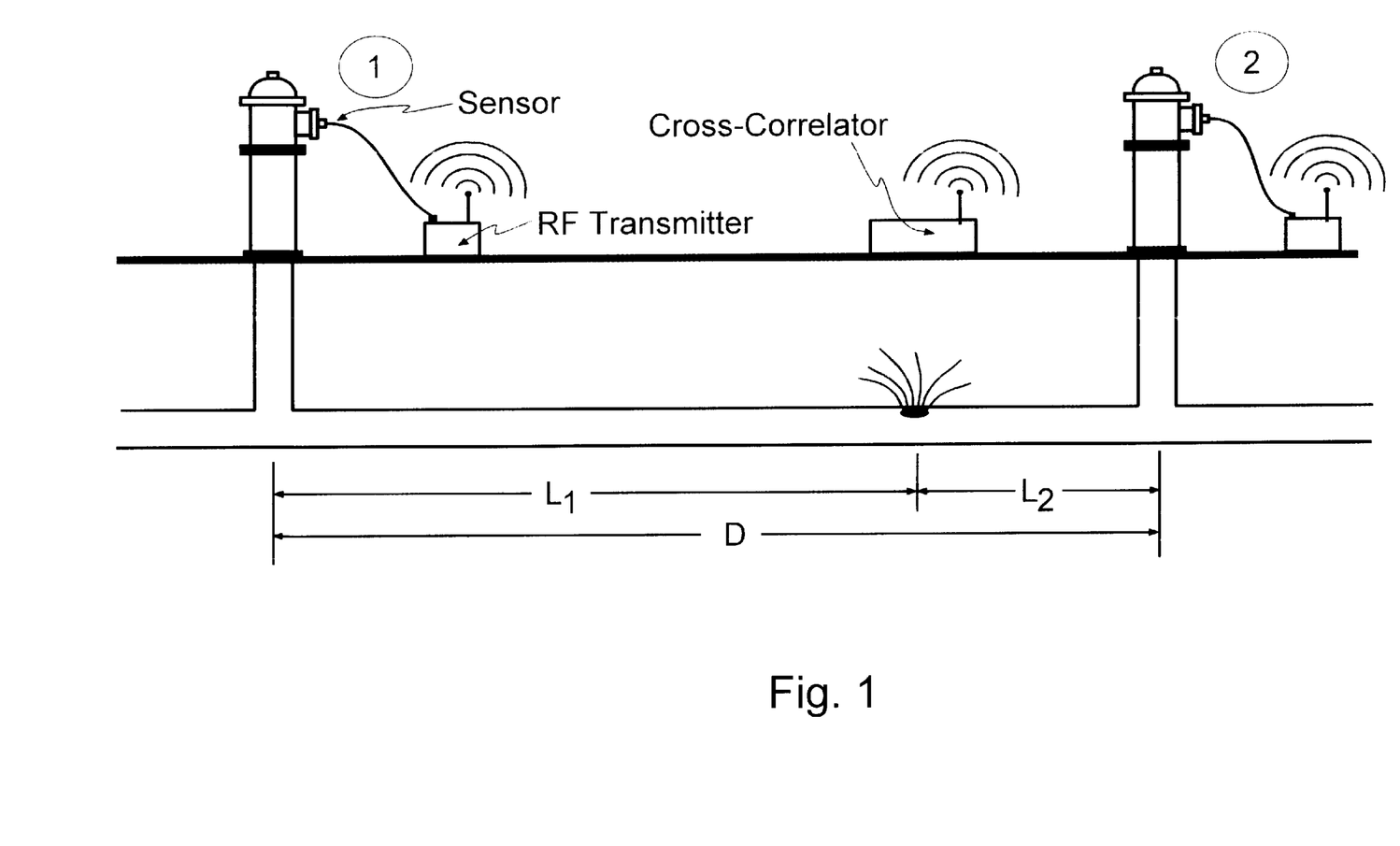
FIG. 1 is a schematic illustration of the field setup for locating a suspected leak by using the cross-correlation or impulse response methods.

The cross-correlation method works by measuring vibration or sound in the pipe at two points that bracket the location of a suspected leak. Vibration sensors (normally accelerometers) are attached to fire hydrants or any other contact points with water pipes as shown schematically in FIG. 1. Alternatively, hydrophones (or underwater microphones) can be used. These are inserted into fire hydrants using modified hydrant caps. Vibration or sound signals are transmitted from the sensors to the correlator wirelessly or using wires. The cross-correlation is calculated for the measured leak signals directly in the time domain or indirectly in the frequency domain. For leak signals $f_1(t)$ and $f_2(t)$ in digital form, the estimate of the cross-correlation function ($\hat{C}_{12}$) is calculated in the time domain using the following sum expression:

$$\hat{C}_{12}(i\Delta t) = \frac{1}{N-i}\sum_{k=1}^{N-i} f_1^k f_2^{k+i}$$

where i=1, 2, ..., M, $\Delta t$ is the sampling interval, $f_1^k$ and $f_2^k$ are the $k^{th}$ samples of signals 1 and 2, respectively, and N is the total number of digital samples. In the above expression, fewer and fewer terms will be included with increasing i. It is therefore necessary to limit M to a small fraction of N, say ¼. In the frequency domain, the estimate of the cross-correlation function ($\hat{C}_{12}$) is obtained via the inverse Fourier transform of the cross-spectral function as $$\hat{C}_{12}^c(\tau) = \text{Re}\left[\frac{1}{\pi}\int_0^{\pi/\Delta t} \hat{E}_{12}(\omega)e^{j\omega\tau}d\omega\right]$$

where $j=\sqrt{-1}$, and $\hat{E}_{12}$ is estimate of the cross-spectral density function defined as $$\hat{E}_{12}(\omega)=\hat{F}_1^*(\omega)\hat{F}_2(\omega)$$

$\hat{F}_1$ and $\hat{F}_2$ are the spectral density functions of signals $f_1(t)$ and $f_2(t)$, respectively. $\hat{F}_1^*$ is the complex conjugate of $\hat{F}_1$. The spectral density function of a signal f(t) is obtained via the Fourier Transform as $$\hat{F}(\omega) = \int_0^T f(t)e^{-j\omega t}dt$$

For signals in digital form, the integrals in the above equations are evaluated by using equivalent summation expressions.

The cross-correlation function obtained in the frequency domain is circular, as indicated by the superscript c. This is due to the implicit periodicity of the time signals in the Fourier transform of finite signals. Time delays corresponding to peaks of circular correlation functions might be distorted. The circular effect is easily eliminated by padding time signals with a zero-amplitude segment of length T.

The estimate of the cross-spectral density function used in the above equations is usually obtained by averaging the results of calculations performed for several records or measurements of time signals as $$\hat{E}_{12}(\omega) = \frac{1}{N_r} \sum_{k=1}^{N_r} F_1^{k*}(\omega) F_2^k(\omega)$$

where k designates signal or record number and $N_r$ is the total number of measurements. Averaging reduces the effect of incoherent random noise on the accuracy of the cross-correlation function. A measure of the relationship of the response at the two measurement points for a particular frequency components is provided by the coherence function defined as $$\hat{\gamma}_{12}^2(\omega) = \frac{|\hat{E}_{12}(\omega)|^2}{\hat{E}_{11}(\omega)\hat{E}_{22}(\omega)}$$

where $\hat{E}_{11}$ and $\hat{E}_{22}$ are estimates of the auto-spectra of measurements at locations 1 and 2, respectively. The value of $\hat{\gamma}_{12}^2$ ranges from 0 to 1—a value of 1 indicates that signals at location 1 and 2 are caused by the same source(s) and value of 0 indicates that the signals at the two locations are unrelated. Values between 0 and 1 indicate the presence of related and unrelated components.

If a leak exists between the two measurement points, the cross-correlation function will have a distinct peak and the corresponding time shift ($\tau_{max}$) will correspond to the difference in arrival times between measured leak signals. In reference to FIG. 1, the time delay between measured leak signals is related to the location of the leak relative to measurement points by $$\tau_{max} = \frac{L_2 - L_1}{c}$$

where $L_1$ and $L_2$ are the positions of the leak relative to sensors 1 and 2, respectively, and c is the propagation velocity of the leak sound in the water pipe. For leaks located at mid-point between the sensors, the time delay is zero. By substituting $L_2 = D - L_1$ in the above equation, the position of the leak relative to point 1 is found as $$L_1 = \frac{D - c \cdot \tau_{max}}{2}$$

where D is the distance between the sensors—usually measured on site or read off system maps. The propagation velocity c depends on the type and size of pipe. Velocity values could be obtained from pipe manufacturers or they could be calculated using the following equation:

$$c = c_o \sqrt{\frac{1}{[1 + a(D/e)(K_w/E_p)]}}$$

where $c_o$ is the propagation velocity of sound in an infinite body of water equal to $\sqrt{K_w/\rho}$, $K_w$ is the bulk modulus of elasticity of water, $\rho$ is density of water, $E_p$ is the modulus of elasticity of the pipe material, D is internal diameter of the pipe, e is the thickness of the pipe wall, and a is constant that depends on the constraints of longitudinal movement of the pipe (a equals 1 for pipes having expansion joints, which is normally the case for water distribution pipes). Preferably, for more accuracy, the propagation velocity should be measured on-site using a known in-bracket or out-of-bracket simulated leak source.

In most cases, leak signals must be filtered to remove high-amplitude narrow-band noise, e.g., resonance response of the pipe and electrical noise caused by ground loops at the power mains frequency. Otherwise, the cross-correlation function of leak signals will be dominated by the frequencies in the narrow-band resonance response or noise and in turn obscures or distorts the peak corresponding to the leak position.

Alternatively, the time difference between leak signals can be determined using the impulse response function also described in the book "Engineering applications of Correlation and Spectral Analysis" written by J. S. Bendat and A. G. Piersol, and published by John Wylie and Sons, New York, 1980. The impulse response function was applied in U.S. Pat. No. 5,038,614 for calculating the time shift between leak signals in wellbore conduits and pipes. The impulse response function is defined as the inverse Fourier transform of the frequency response function (i.e., transfer function between output and input), that is, $$\hat{I}_{12}^c(\tau) = \text{Re}\left[\frac{1}{\pi} \int_0^{\pi/\Delta t} \hat{H}_{12}(\omega) e^{j\omega\tau} d\omega\right]$$

where the transfer function $\hat{H}_{12}(\omega)$ is given as $$\hat{H}_{12}(\omega) = \frac{\hat{E}_{12}}{\hat{E}_{11}}$$

Previous implementations of the cross-correlation and impulse response methods for detecting leaks in municipal water distribution pipes as well a traditional listening devices suffer from several disadvantages. These include the following:

The cross-correlation method does not perform well for leak signals that have concentration of power in a narrow frequency band. For such signals, commonly found in plastic pipes, peaks corresponding to a leak and those caused by out-of-bracket sources become distorted or difficult to distinguish due to the "spreading effect" of the peaks. The narrower the frequency band the more spread are the peaks and in the limit the cross-correlation function becomes a harmonic one for infinitely narrow-band signals.

For narrow band signals, the impulse response function might provide improved resolution of cross-correlation peaks due to its "computational whitening" effect of leak signals. Although the impulse response method might provide improved resolution for signals having power concentration in one or more frequency bands, the spectrum of the signals must extend over a wide range. In other words, the impulse response function, does not provide improved performance for "truly" narrow band signals in which the data outside the main frequency band is extremely small and/or is dominated by noise. Leak signals in plastic pipes are truly narrow band signals.

In plastic pipes also, leak signals are attenuated over distance at a much higher rate that in other types of pipe. In view of the fact that the leak is usually positioned asymmetrically between measurement points, measured leak signals will have significantly different power levels. Therefore if the higher level signal is used as the reference one in the impulse response calculation, the whitening effect of this method will not be effective and the transfer function will be dominated very narrow band peaks, e.g., resonance response of the pipe.

Previous implementations of leak detection systems require specially designed and integrated hardware. Therefore, they are expensive, inflexible, and difficult to modify.

Existing listening devices are not effective for leaks in plastic pipes unless they are used very closed to leaks. The power of leak signals in plastic pipes is concentrated in a narrow low-frequency range (<50 Hz). The human hearing is not sensitive enough to sound at frequencies in this range.

Pre-filtering of leak signals using digital filters to remove interfering noise is time consuming. This is especially the case when leak signals have to be analyzed several times to find an optimum cross-correlation result or when very long leak signals have to be used to improve signal-to-noise ratio for low level leak signals.

In order to overcome some of the above noted shortcomings of the prior art it is an object of the invention to provide an improved method of leak detection.

SUMMARY OF THE INVENTION

In accordance with the invention there is provided a method of detecting leaks in pipes, in particular plastic pipes and other non-metallic pipes, comprising the steps of: measuring of leak-induced sound or vibration in a water pipe from a first location and from a second location simultaneously to provide first and second signals respectively, the first and second location separated by a known distance of pipe; and, calculating an enhanced impulse response function or a post-filtered cross-correlation function based on the first and second signals to determine a leak location within the pipe, the leak location a distance from the first location. In accordance with the invention also there is provided a method for digitally shifting the frequency content of leak-induced sound. In accordance with the invention acquisition and processing of and listening to leak signals are carried out via multimedia-equipped personal computers. The present invention offers the following advantages:

The enhanced impulse response method eliminates the need for pre-or post-filtering of interfering noises and hence eliminates the uncertainty and difficulties encountered by non-experts in selecting filter settings especially for low-frequency narrow band signals such as those prevalent in plastic and other non-metallic pipes.

Post-filtering of the cross-correlation function using digital filters is considerably more efficient than the prior practice of pre-filtering leak signals.

Digitally shifting the frequency content of leak-induced sound makes it possible to hear low-frequency leak-induced sound prevalent in plastic and other non-metallic pipes by shifting their frequency content to a range audible to a typical human ear.

Utilising multimedia-equipped personal computers to record, process and playback leak signals provides proved suitable for low-level signals and in turn eliminated the need for specialised and costly data acquisition and processing hardware.

BRIEF DESCRIPTION OF THE DRAWINGS

The invention will now be described with reference to the drawings in which.

DETAILED DESCRIPTION OF THE INVENTION

According to the invention, an enhanced impulse response function or a post-filtered cross-correlation function is used to determine a distance from a known location to a leak along a pipe conducting fluid under pressure. The use of an the enhanced impulse response allows for captured signals to be processed absent filtering which is highly advantageous because filtering of signals relating to leaks in a pipe, especially those having narrow band frequency spectra, is often difficult and filtering errors lead to incorrectly located leaks. Reducing the number of potential sources of errors is advantageous. Further, the use of an impulse response is well suited to locating leaks in plastic pipes. Post-filtering of the cross-correlation function, to remove interfering noise, is more efficient than pre-filtering of leak signals, more so when cross-correlation is calculated in the frequency domain.

Another inventive feature of the present embodiment of the invention is that sound signals can be captured and replayed at a different frequency to allow a human user to hear leaks in, for example, plastic pipes wherein the sound signal relating to such a leak is at a frequency that is inaudible.

Figure 2:
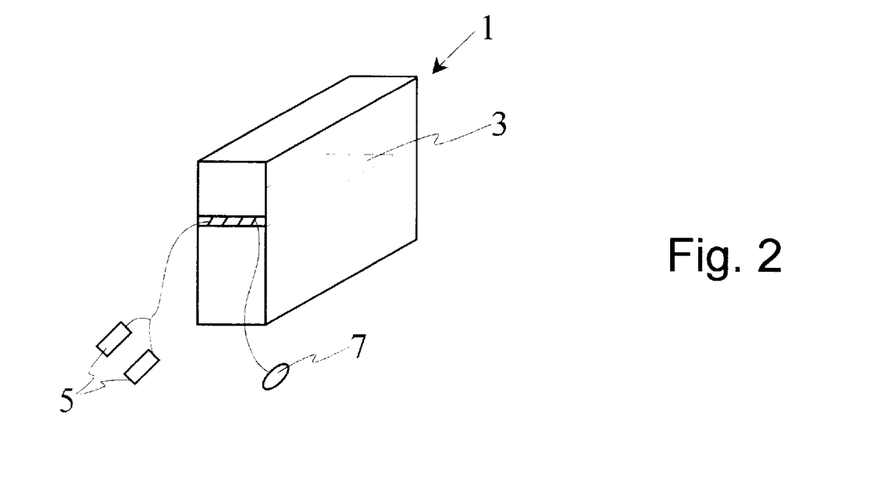
FIG. 2 is a simplified diagram of a PC having a sound card coupled to a set of speakers and to a sensor.

Turning now to an embodiment of the present invention and referring to FIG. 2, a PC 1 is shown having a sound card 3 coupled to a set of speakers 5 and to a microphone 7 in the form of a leak sensor. The leak sensor 7 is similar to those typically used in the field of leak detection. Optionally, when a portable computer is used, headphones (not shown) are used in place of the speakers in order to facilitate use of the unit.

The present invention is implementable in part as a PC-based software application to locate leaks in water distribution pipes using an enhanced impulse response technique. An exemplary embodiment of the invention is implemented and titled LeakFinder. This software represents a new radical concept that taps into the capabilities of multimedia components of modern PCs, mainly their soundcards, to record and playback leak signals. It also utilises a high-speed CPU of presently available PCs to perform computationally-intensive calculations of impulse response and cross-correlation functions. Nowadays, PCs incorporate extremely fast CPUs as well as soundcards having analogue-to-digital resolution of at least 16-bits—surpassing that of commonly used data acquisition systems in many research labs. Utilising multimedia components in leak detection in water pipes and other scientific applications has been traditionally overlooked because of concerns over further noise introduce by these components as well as by the systems in which they are installed. However, the nature of this noise proved to be inconsequential in this implementation for the acquisition and processing of leak signals.

LeakFinder, as implemented, is a windows-based application that runs under either Windows NT or Windows 98. Of course, the application could be implemented to operate with any operating system as dictated by design requirements. The present application has user-friendly menus and data displays, but this need not be so. The LeakFinder software is readily integrated with commercially available digital or analogue wireless RF-based data transmitters and leak sensors such as hydrophones and accelerometers—thus providing a complete leak locating system.

The LeakFinder leak detection system overcomes many limitations of existing "black-box" commercial leak noise correlators. Its features include very low-frequency response, a wide-range of spectral estimates, storage of raw data for off-site analysis, finely-tunable digital filters for noise suppression and so forth. Advantageously, it is inexpensive relative to a typical leak detection system which on average costs about $50,000. This renders the system affordable for use in underdeveloped countries where water leak rates are as high as 70% of production.

Figure 3:
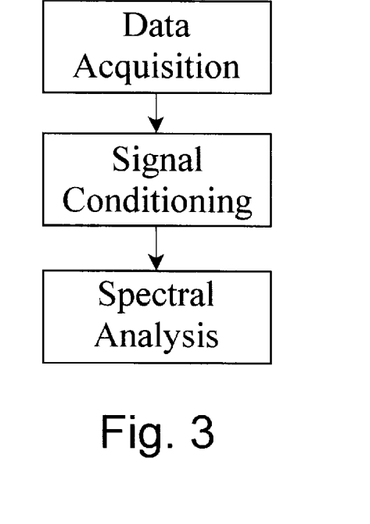
FIG. 3 is a simplified block diagram of an exemplary system according to the invention comprising three main modules: (i) a data acquisition module, (ii) a signal conditioning module including digital filters, and (iii) a spectral analysis module.

Referring to FIG. 3, the system comprises three main modules: (i) a data acquisition module, (ii) a signal conditioning module including digital filters, and (iii) a spectral analysis module. These modules as well as processing and analysis parameters, program output, and verification examples are presented below. A listing of pertinent sections of the system's computer software code is included in appendix A.

Data Acquisition Module

Figure 4:
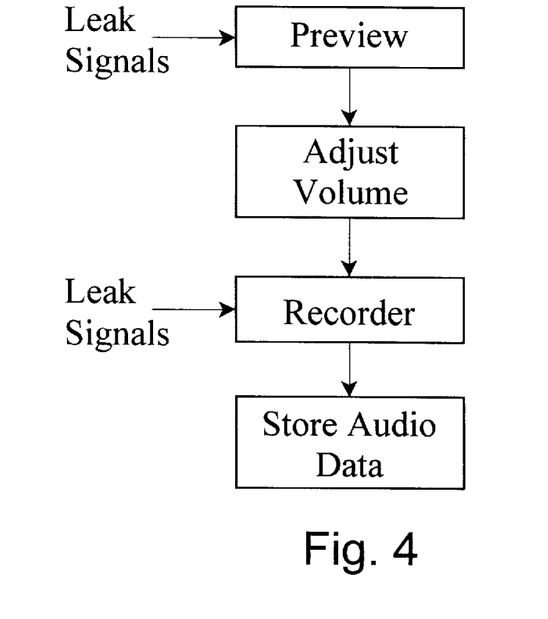
FIG. 4 is a simplified data flow diagram of the data acquisition module.

Referring to FIG. 4, a block diagram and data flow diagram of the data acquisition module is shown. In the data acquisition module, leak signals are recorded using the soundcard of the PC at any of the card's sampling frequencies, normally between 11,025 and 44,000 Hz. Recorded leak signals can be stored in either standard .wav or .ascii formats. Typical user-specified data acquisition parameters include the following: data recording mode, e.g., stereo or mono, resolution, sampling frequency, duration, and volume controls for recording and playback. The soundcard are set to stereo mode (i.e., dual-channel input) when the system is used for locating leaks using a cross-correlation method, and to mono mode when measuring leak sounds at one point only such as in listening surveys. Of course, when listening devices are used remotely and sound recordings are time stamped, it is possible to use the method of the present invention with two separate audio data files.

Normally, leak signals are recorded using 16-bit resolution and the lowest possible sampling rate of the soundcard (e.g., 11,025 Hz). In most cases, it is sufficient to record leak signals for a duration between 30 to 60 seconds. Of course, the selection of duration and sampling rate is straightforward to those of skilled in the art. Optionally, it is automated in software.

In record mode, the volume control is preferably adjusted to utilise as much as possible of the soundcard's voltage range, without overloading it, in order to achieve a high signal-to-noise ratio. Of course, this may also be automated. The volume control of the record mode is easily set in software to an appropriate level while checking the level of leak signals using, for example, a preview function. The preview function records and displays leak signals without saving them to disk. Once the recording volume control level is selected, the signals are recorded and saved to disk using the record function. The complete time history of saved signals is optionally stored, displayed and/or printed using Leak Finder's display function.

Signal Conditioning Module

In LeakFinder, the frequency range of recorded leak signals can be optionally limited in order to suppress interfering noise components by applying low and high-pass digital filters at user-specified cut-off frequencies. In accordance with this invention, one may opt to post-filter when the cross-correlation function is used for locating a leak instead of pre-filtering of the leak signals themselves. The effect of filtering method is demonstrated in FIG. 4. The filters are of the recursive 4th order Butterworth type. The square of the absolute value of the transfer function has the following forms for low and highpass filters of this kind, respectively.

$$|H(f)|^2 = 1/(1+(\tan \pi f \Delta t/\tan \pi B \Delta t)^{2M})$$

and $$|H(f)|^2 = 1/(1+(\cot \pi f \Delta t/\tan \pi B \Delta t)^{2M})$$

where $f$ is frequency, B is filter cutoff frequency (or 3 dB point), $\Delta t$ is sampling interval, and M is number of poles or order of the filter (set to 4 in the present embodiment of LeakFinder). Filtering is applied in both the forward and reverse directions of leak signals to eliminate time delays caused by the response of filters. Of course, when impulse response is used, filtering need not be performed.

A unique feature of LeakFinder is that the speed at which leak signals are played back is alterable. For example the speed is increased or decreased arbitrarily by simply overriding the sampling frequenting at which leak signals were digitally recorded with a higher or lower sampling frequency. This is very useful when playing back leak signals detected within plastic pipes or other non-metallic pipes, which only have very low-frequency components, e.g., in the infra-sound range, and thus cannot be heard by an unaided human ear. Speeding up the playback of low-frequency signals shifts their frequency content to a higher range at which the sensitivity of human hearing is sufficient to detect the leak sound. Thus, the present system overcomes a shortcoming in the prior art that leaks in plastic pipes could not be previewed using listening devices since they typically are inaudible.

Spectral Analysis Module

Figure 5A:
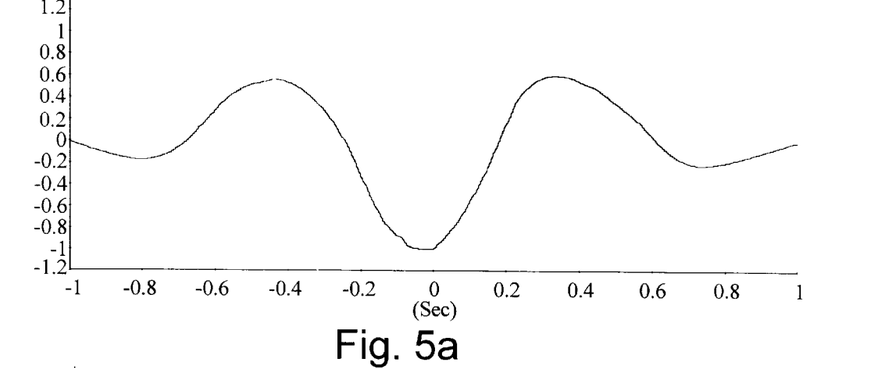
FIGS. 5a–c illustrate a graphical demonstration of the effect of filtering method on the cross-correlation function (test07.t03, npoint=1024, nzero=512, HP=15 Hz, LP=100 Hz)
Figure 5B:
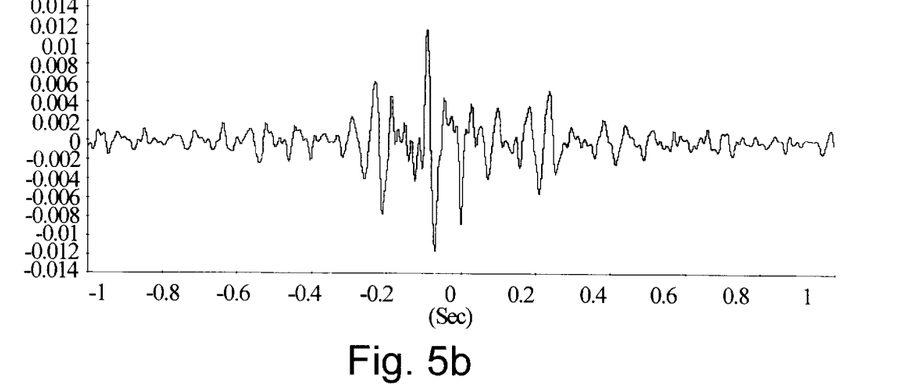
Figure 5C:
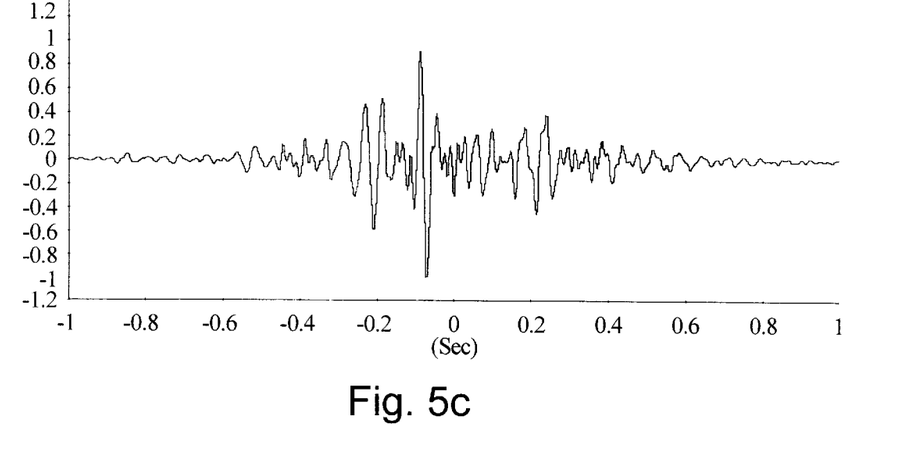
Figure 6A:
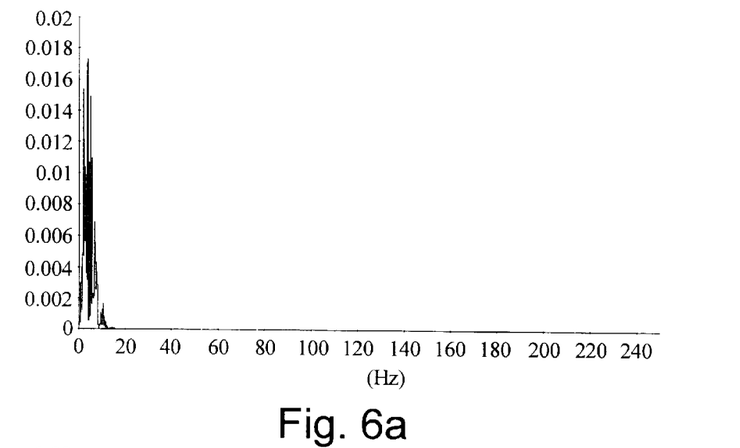
FIGS. 6a–f illustrate a graphical demonstration of the effect of upper integration limit on the impulse response function (test04.t08, channels reversed, npoint=4096, nzero=2048)
Figure 6B:
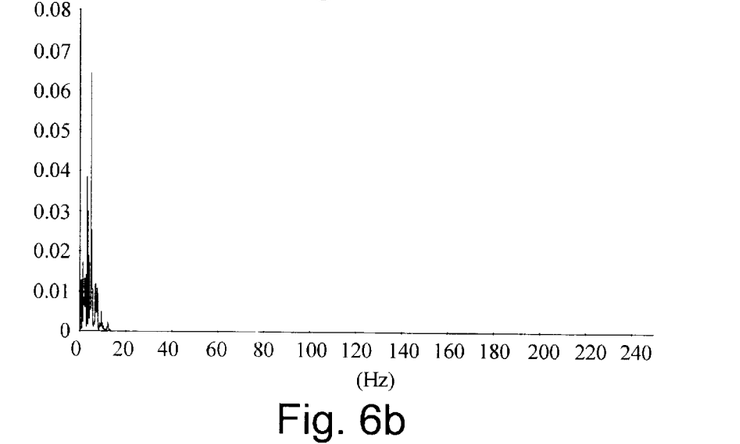
Figure 6C:
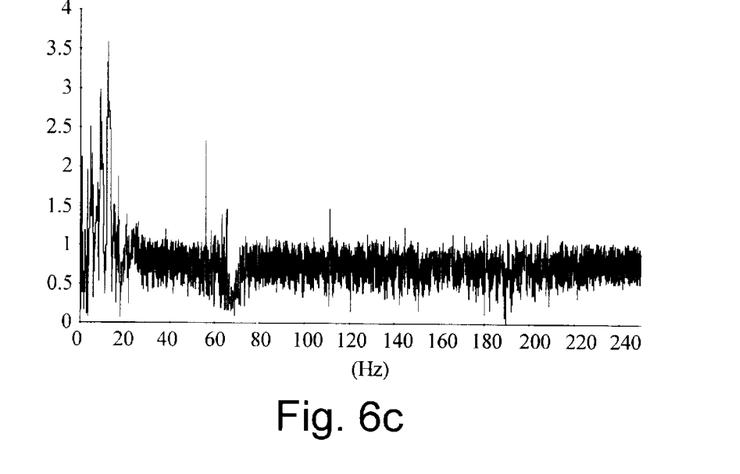
Figure 6D:
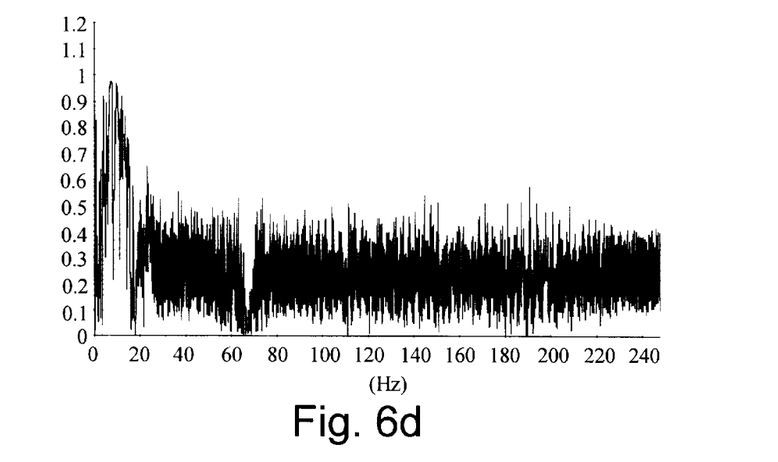
Figure 6E:
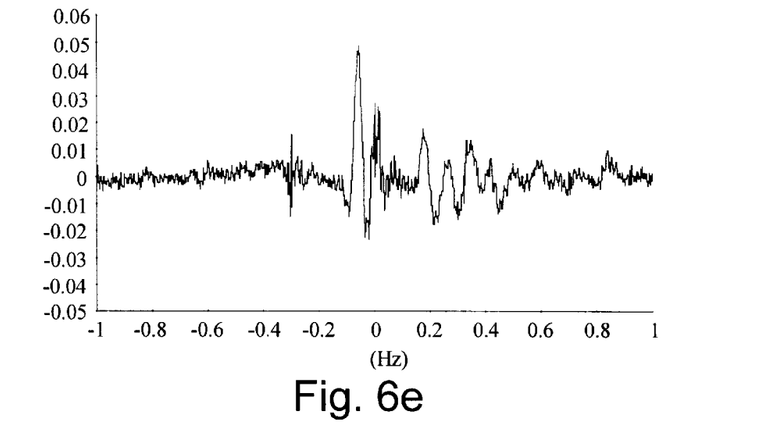
Figure 6F:
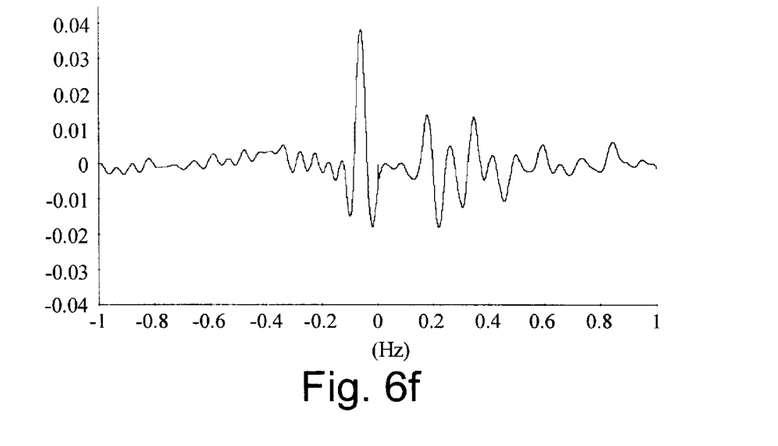
Figure 7A:
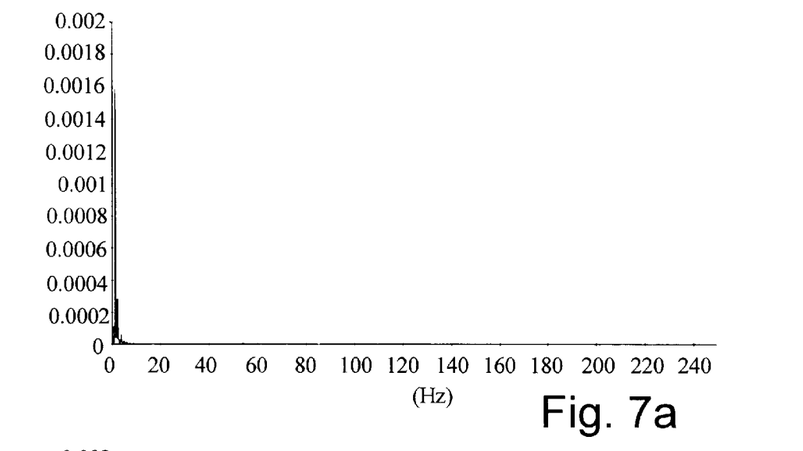
FIGS. 7a–f show a graphical demonstration of the effect of reference channel on the impulse response function (test16.t03, npoint=4096, nzero=2048, upper integration limit=50 Hz)
Figure 7B:
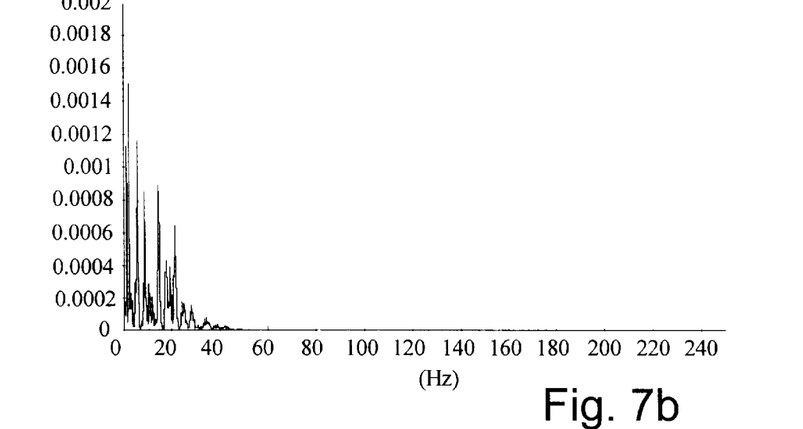
Figure 7C:
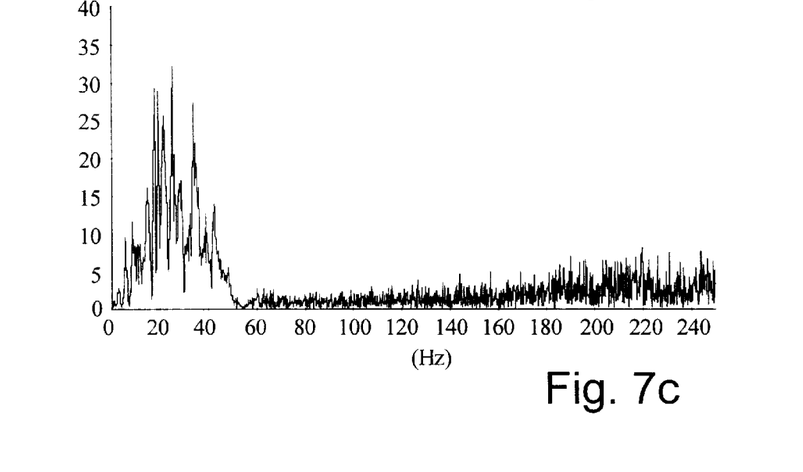
Figure 7D:
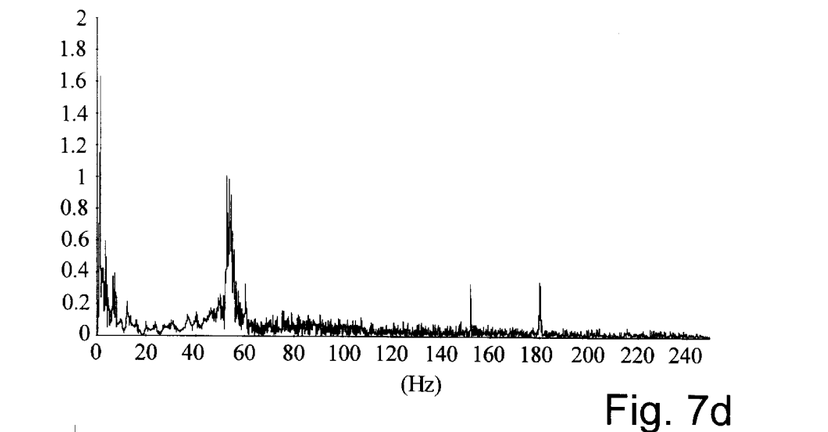
Figure 7E:
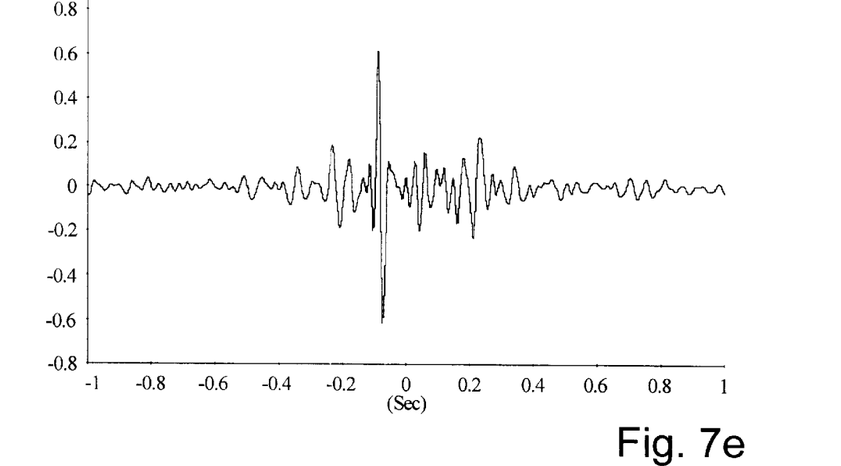
Figure 7F:
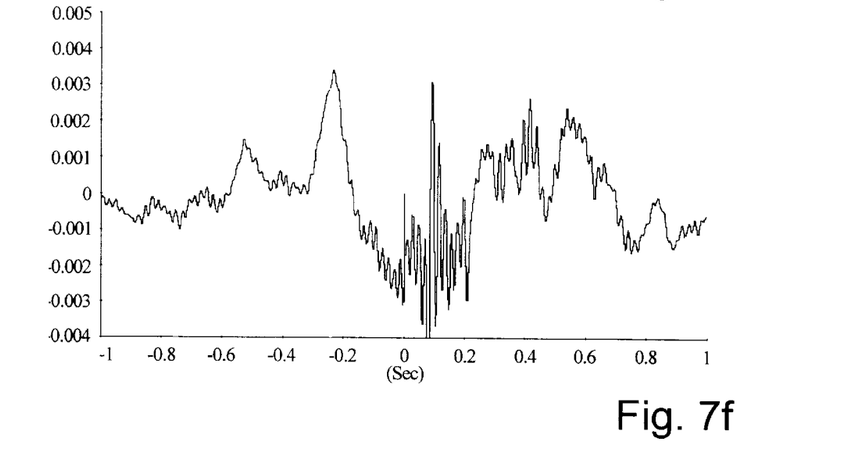

In the spectral analysis module, a position of the leak source is calculated using the time shift corresponding to the maximum of an enhanced impulse-response function or post-filtered cross-correlation function. The functions are calculated in the frequency domain as described in the section titled "Review of Prior state-of-the-art". Although the impulse response function might provide improved resolution for signals having power concentration in one or more frequency bands, the spectrum of the signals must extend over a wide range. For "truly" narrow band signals in which the data outside the main frequency band is extremely small and/or is dominated by noise, which is the case for plastic pipes, the impulse response method does not provide improved performance over the cross-correlation function. In accordance with this invention in order to improve the performance of the impulse response function for low-frequency truly narrow band leak signals, the upper integration limit of the inverse Fourier transform used in calculating the impulse response function normally taken as the Nyquist frequency is replaced by the frequency beyond which power of leak signals or the value of the transfer function between them is small. For example, for 6 and 8 inch plastic pipes and typically used sensor-to-sensor spacing of 300 to 500 feet, this upper limit could be between 25 to 50 Hz. Auto-spectra of leak signals, transfer function, coherence function, and impulse response functions calculated with upper integration limit equal to Nyquist frequency and 20 Hz are shown in FIGS. 5a–c for a simulated service connection leak in an 8-inch plastic PVC pipe.

The impulse response function may not provide improved performance over the cross-correlation function when leak signals are excessively damped or attenuated over distance such as occurs in plastic pipes and other non-metallic types of pipe. For such situations, measured leak signals will have significantly different power levels and therefore if the higher level signal is used as the reference signal in the impulse response calculation, the whitening effect of this method is not achieved and the transfer function is dominated by very narrow band peaks, e.g., resonance response of the pipe. In accordance with this invention in order to avoid this drawback, the low level signal is always used as the reference signal. The effect of the reference channel on the impulse response function is demonstrated in FIGS. 6a–f for a joint leak in a 6-inch plastic PVC pipe.

The impulse response function may not provide improved performance over the cross-correlation function when leak signals are excessively damped or attenuated over distance such as occurs in plastic pipes and other non-metallic types of pipe. For such situations, measured leak signals will have significantly different power levels and therefore if the higher level signal is used as the reference signal in the impulse response calculation, the whitening effect of this method is not achieved and the transfer function is dominated by very narrow band peaks, e.g., resonance response of the pipe. In accordance with this invention in order to avoid this drawback, the low level signal is always used as the reference signal. The effect of the reference channel on the impulse response function is demonstrated in FIG. 6 for a joint leak in a 6-inch plastic PVC pipe.

LeakFinder performs spectral analysis on filtered or unfiltered leak sound signals and produces the following spectral estimates: (i) auto-spectra of the signals, (ii) coherence function, (iii) cross-correlation function, and (iv) impulse response function. The auto-spectra provide information about the frequency content of leak signals. The coherence function provides a measure of the relationship between recorded leak signals—i.e., whether they were induced by the same source or not. The closer the coherence function to 1, the more related the signals. The cross-correlation and impulse response functions provide information about a time lag between leak signals which in turn is used to calculate a leak location. The impulse response function, unlike the cross-correlation function, eliminates a need to filter leak signals to remove interfering low-frequency pipe resonance. Consequently, it avoids the uncertainty involved in selecting filter cut-off frequencies. A user need only specify a frequency above which the amplitude of the auto-spectra of the leak signals or the transfer function between them becomes insignificant. Of course, this task is optionally automated based on material type or other detectable qualities of the sound signal.

Processing and Analysis Parameters

Optionally, user-specified parameters and options are provided for digital filtering and spectral analysis of leak signals including the following: filter ON/OFF switch, cut-off frequency of low and high-pass filters, number of points in the Fast Fourier Transform (FFT), number of zero-points, propagation velocity of leak signals in the water pipe, sensor-to-sensor spacing, and finally modified sampling frequency of leak signals. Typical values for FFT size and number of zero-points are 1024 and 512 points, respectively corresponding to a rectangular force-window with 50% overlap.

Sensor-to-sensor spacing could be determined from system maps but preferably should be measured on-site. The propagation velocity depends on the type, material and size of pipe. Typical velocities were not programmed in the software but appropriate values are often found in tables used by those of skill in the art for several types and sizes of water pipes. Alternatively, they can be calculated using the equation described above.

Appropriate cut-off frequencies of low and high-pass filters to be applied when a cross-correlation function is used for locating a leak depend on the type of pipe and sensor-to-sensor spacing and therefore no fixed rules are specified herein. That said, normal experimentation will lead to useful values. Normally, the cut-off frequencies are selected so that they correspond to the frequency range where the amplitude of the auto-spectra of leak signals is significant and the coherence function is high. However, this is not always evident, especially for plastic pipes for which the amplitude of leak signals is very small and their frequency content is narrow and occurs in the low-frequency range close to pipe resonance. Recommended high and low-pass cutoff frequencies for typical plastic water distribution pipes, e.g., 6" or 8" PVC pipes, are 10 and 100 Hz, respectively. The high-pass limit may need to be increased or decreased in small increments, e.g., 1 or 2 Hz, until a distinct peak emerges. The option of post-filtering the cross-correlation function embodied in this invention is much more efficient in this case than pre-filtering of leak signals and recalculating the cross-correlation function. For metal pipes, leak signals contain much higher frequency components than plastic pipes and consequently a high frequency range is preferably used for determining the distance to the leak, e.g., 200 to 800 Hz.

Leak signals in water distribution pipes rarely contain frequency components above 1000 Hz in the case of metal pipes and above 200 Hz in the case of plastic ones. Therefore, in order to speed up digital filtering and spectral analysis of the leak signals, the sampling frequency of recorded signals is optionally reduced to selected frequencies, e.g., 500, 1000, 2000, and 5000 Hz depending of course on their frequency content and the required resolution for locating suspected leaks.

Output of Analysis

The results of spectral analysis are then provided graphically and include a time shift corresponding to a maximum of the impulse response function, the calculated leak position from the measurement point of one of the signals, and signal processing and analysis parameters. The results are optionally transmitted to a printer or exported to a spreadsheet. A function that calculates a leak position corresponding to any time shift of any peak or point in the impulse response or cross-correlation functions is provided that is very useful for measuring the leak signal propagation velocity from peaks corresponding to coherent out-of-bracket sources.

Verification of Results

Figure 8A:
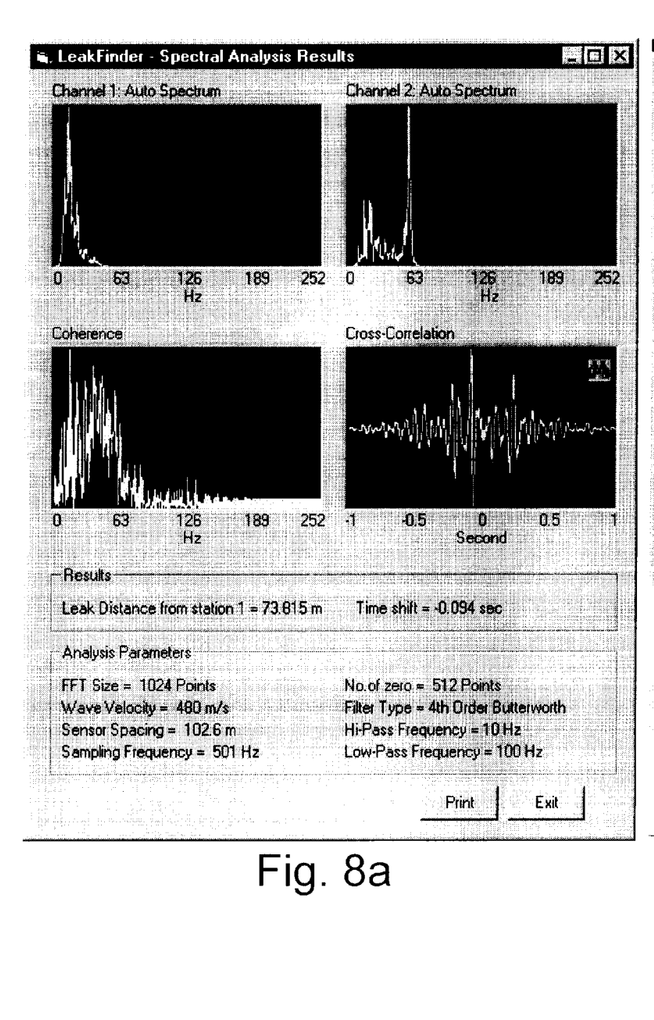
FIGS. 8a–b provide a comparison of results for leak signals in 6" PVC pipe acquired and analysed using Leak-Finder and TurboLab PC-based systems (actual leak position is 73.5 m from sensor 1 or A)
Figure 8B:
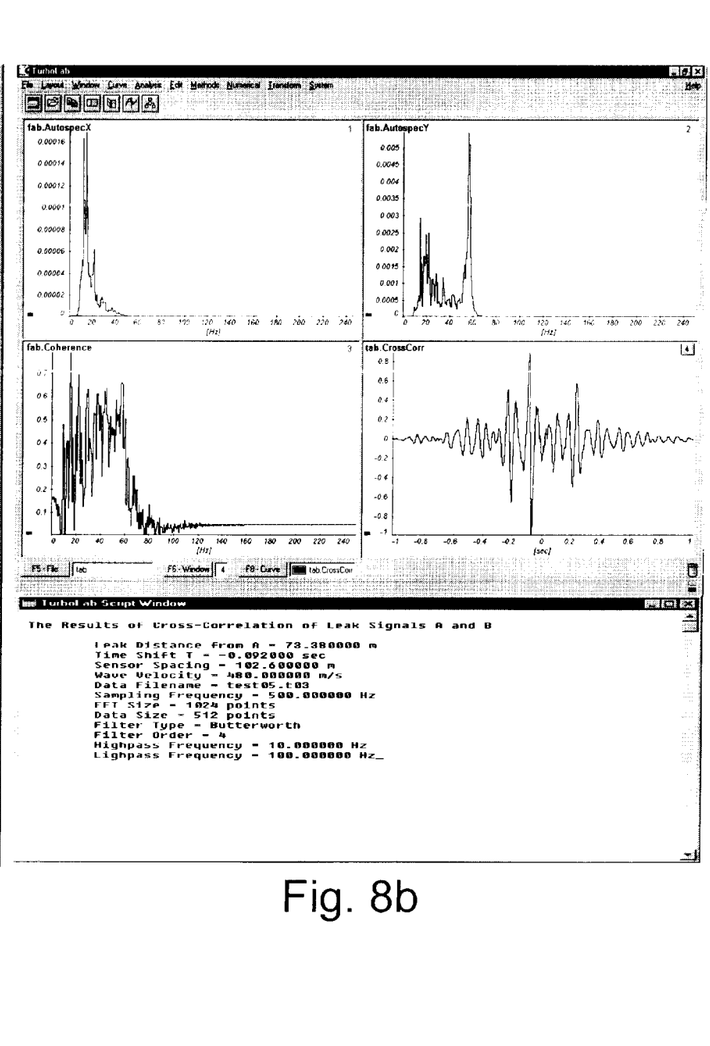
Figure 8C:
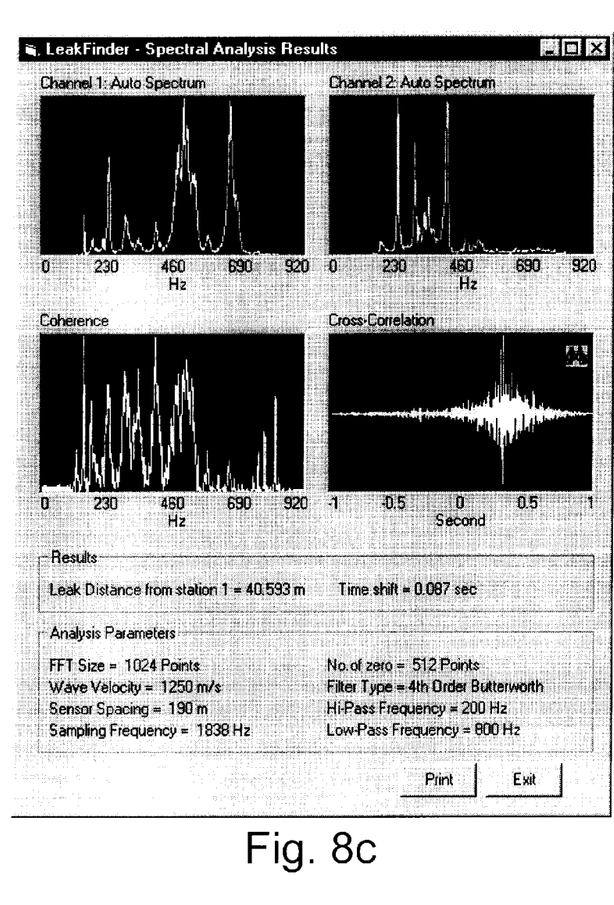
FIGS. 8c–d provide a comparison of results for leak signals in 8" ductile iron pipe acquired and analysed using LeakFinder and TurboLab PC-based systems (actual leak position is 40 m from sensor 1 or A)
Figure 8D:
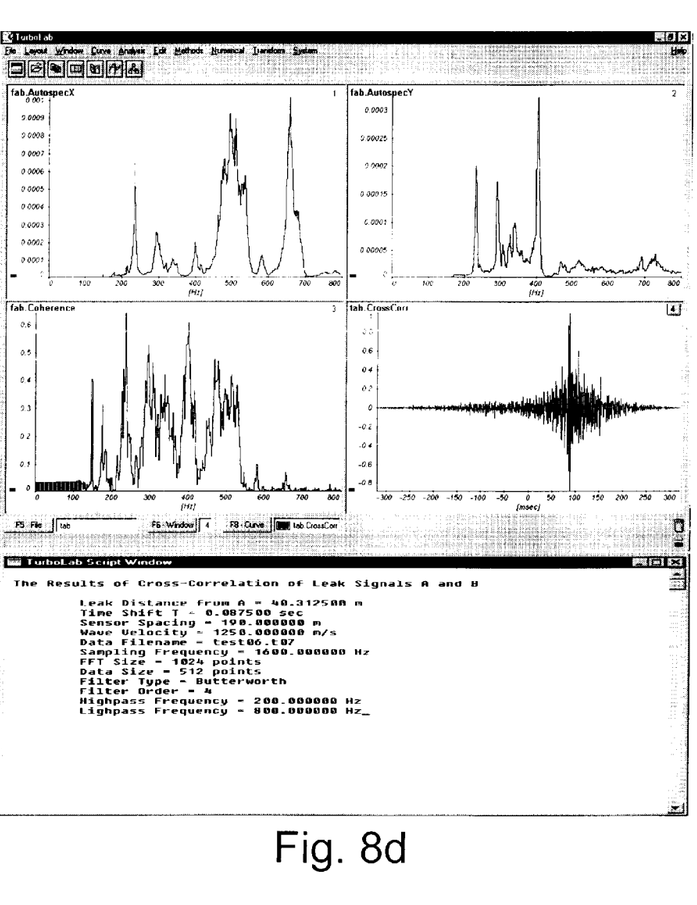
Figure 9:
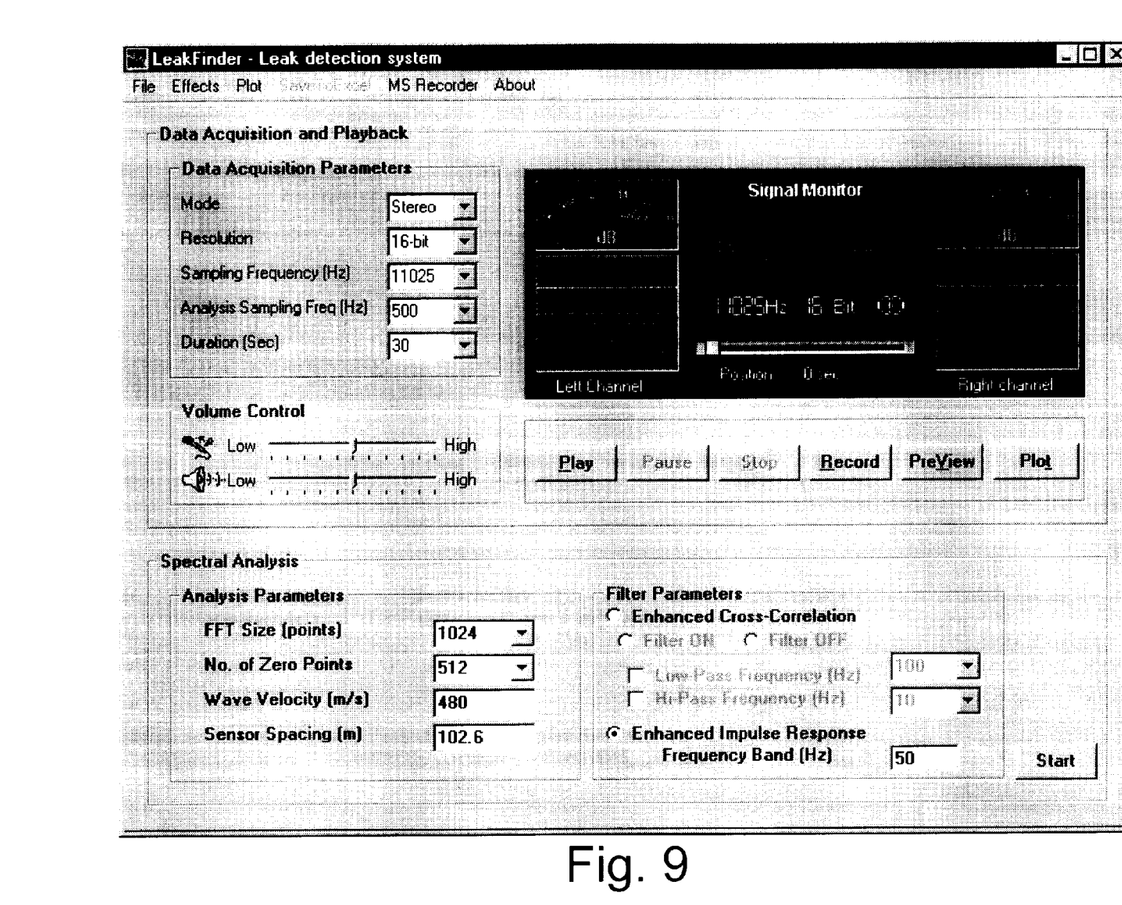
FIG. 9 is an exemplary main graphical user interface (default)
Figure 10:
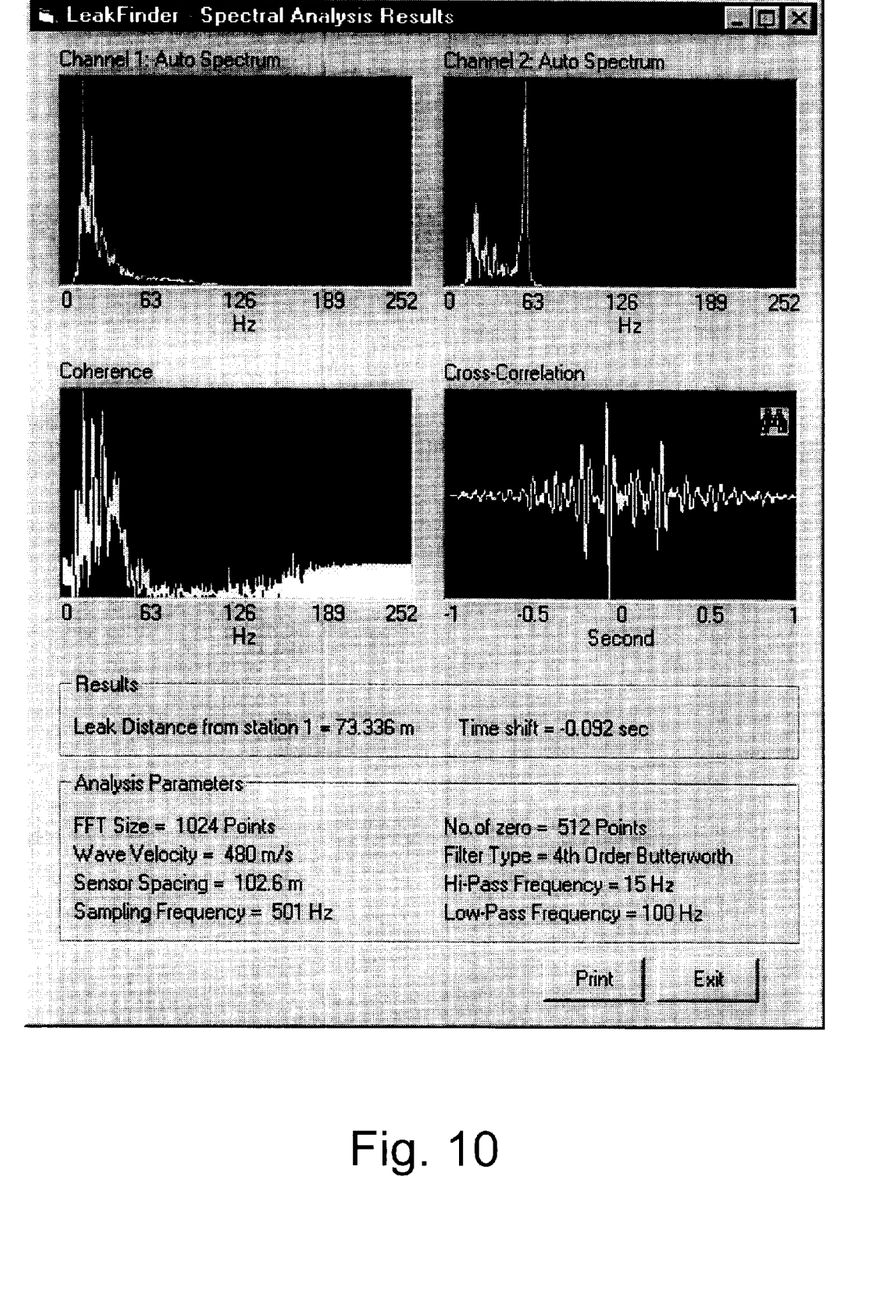
FIG. 10 is an exemplary graphical display of spectral analysis results.
Figure 11:
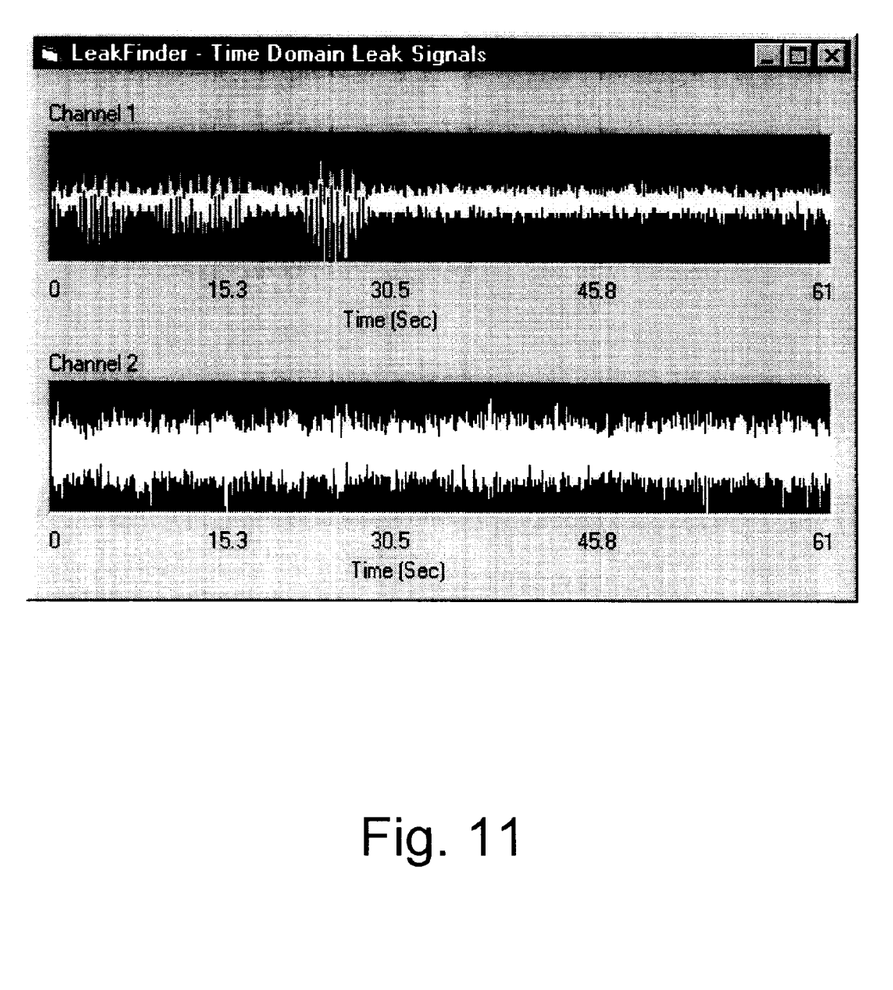
FIG. 11 is an exemplary graphical display of the time history of recorded leak signals.

LeakFinder was implemented and tested extensively. The results were compared to known results. The results obtained with LeakFinder were compared with those obtained with a PC-based data acquisition system consisting of analogue-to-digital conversion board, power amplification board, anti-aliasing filters, and spectral analysis software (TurboLab version 4.3). The results were in excellent agreement. Example results for leak signals in plastic and metal pipes analysed with both systems are shown in FIGS. 8a and 8b.

Program code according to the invention is included herein in Appendix A.

Numerous other embodiments of the invention may be envisaged without departing from the spirit or scope of the invention.

What is claimed is:

1. A method of detecting leaks in pipes comprising the steps of:
    listening to a leak in a fluid pipe from a first location and from a second location simultaneously to provide first and second signals respectively, the first and second location separated by a known distance of pipe; and,
    calculating an impulse response over a finite range of frequencies based on the first and second signals and using the channel having a lower amplitude as the reference signal to determine a leak location within the pipe, the leak location a distance from the first location.

2. A method as defined in claim 1 wherein the finite range is range over which amplitude is non-negligeable.

3. A method as defined in claim 2 comprising the step of automatically determining the range and analysing only that range within the leak signals.

4. A method as defined in claim 1 wherein the method is implemented in a personal computer having a sound circuit therein for digitising sound signals and for providing sound signals to speakers for playback of recorded sounds.

5. A method of detecting leaks in pipes comprising the steps of:
    listening to a leak in a fluid pipe from a first location and from a second location simultaneously to provide first and second signals respectively using a first and a second acoustic sensor coupled to a sound circuit within a personal computer, the first and second location separated by a known distance of pipe; and,
    calculating a leak location within the pipe absent a step of filtering the signals to reduce a noise content of the signals.

6. A method as defined in claim 5 wherein the step of calculating is performed using a cross-correlation function.

7. A method as defined in claim 6 comprising the step of filtering a result of the cross correlation function.

8. A method as defined in claim 5 wherein the step of calculation includes the step of calculating an impulse response over finite range.

9. A method of detecting leaks in pipes as defined in claim 8 wherein a reference channel is selected for the impulse response calculation as the leak signal having a lower amplitude in order to reduce effects of noise upon a result.

10. A method as defined in claim 5 wherein the sound circuit is a commercially available sound card for providing sound functionality to the personal computer.

11. A method as defined in claim 5 wherein the sound circuit forms an integral part of the motherboard of the personal computer.

12. A method for determining the location of a leak in a pipe comprising the steps of:
    providing first and second sensor means operably connected to said conduit for generating signals related to sensing vibrations of said conduit; recording said signals as a function of time;
    determining the time difference between arrival of vibrations which generate signals at said first sensor means and said second sensor means, respectively, by
    subjecting a plurality of multiple point consecutive time records for each signal to fast Fourier transform analysis of the time domain data to produce auto spectra values of said first sensor signal, $G_{aa}$, and said second sensor signal, $G_{rr}$, respectively;
    calculating the cross spectra values, $G_{ar}$, of the respective series of time records of said first and second signals, respectively;
    summing the auto spectra values and the cross spectra values and determining averages of each, respectively;
    calculating the impulse response over a finite range by determining the inverse Fourier transform of the ratio of the averaged cross spectra to the averaged auto spectra of at least one of said auto spectra over a finite range;
    determining a peak value of such resultant values from time=0 to determine said time difference; and
    determining the location of said event based on said time difference and the acoustic velocity of a stress wave in the pipe.

13. A method of detecting leaks in pipes as defined in claim 12 wherein a reference channel is selected for the impulse response calculation as the leak signal having a lower amplitude in order to reduce effects of noise upon a result.

14. A method as defined in claim 12 wherein the finite range is range over which amplitude is non-negligible.

15. A method as defined in claim 14 comprising the step of automatically determining the range and analysing only that range within the leak signals.

16. A method as defined in claim 12 wherein the method is implemented in a personal computer having a sound circuit therein for digitising sound signals and for providing sound signals to speakers for playback of recorded sounds.

17. A method of detecting leaks in pipes comprising the steps of:
    listening to a leak in a fluid pipe using an acoustic sensor to form leak signals from a first location and from a second location simultaneously to provide first and second signals respectively, the first and second location separated by a known distance of pipe;
    digitising the leak signals using a sound circuit within a personal computer, sound circuit introducing significant noise into the signals; and,
    calculating a leak location within the pipe using a method of calculation that reduces effects of the noise introduced by the sound circuit and absent a step of filtering the leak signals.

18. A method of detecting leaks in pipes as defined in claim 17 wherein the step of calculating a leak location is performed by performing a cross correlation between the leak signals and filtering the result.

19. A method of detecting leaks in pipes as defined in claim 18 wherein the result is filtered by the steps of iteratively filtering the result with different filters to determine a suitable peak from which to derive leak location data.

20. A method of detecting leaks in pipes as defined in claim 18 wherein the result is filtered by the steps of iteratively filtering the result with different filters and selecting a filtered result having a most pronounced peak indicative of a leak location.

21. A method of detecting leaks in pipes as defined in claim 17 wherein the step of calculating a leak location is performed by performing an impulse response function on the signals over finite range.

22. A method of detecting leaks in pipes as defined in claim 21 wherein a reference channel is selected as the leak signal having a lower amplitude in order to reduce effects of noise upon a result.

23. A method as defined in claim 17 wherein the sound circuit is a commercially available sound card for use in a personal computer including an analogue to digital converter and a digital to analogue converter.

24. A method as defined in claim 23 wherein the sound circuit is also for providing an audible output representative of the leak signal.

25. A method of detecting leaks in pipes comprising the steps of:

listening to a leak in a fluid pipe using an acoustic sensor to form a leak signal from a first location to provide a first signal,     digitising at a first sampling rate the leak signal using a sound circuit; and,     playing the leak signal at a second different sampling rate than the rate at which it was digitised in order to shift sounds at inaudible frequencies to frequencies at which they are audible.

\* \* \* \* \*